United States Patent [19]

Nakamura et al.

[11] Patent Number: 5,880,206
[45] Date of Patent: Mar. 9, 1999

[54] RUBBER COMPOSITION AND PROCESS FOR PRODUCING THE SAME

[75] Inventors: Masao Nakamura; Yukio Takagishi, both of Kawasaki; Minoru Fukunaga, Kudamatsu, all of Japan

[73] Assignee: Nippon Zeon Co., Ltd., Tokyo, Japan

[21] Appl. No.: 696,907

[22] PCT Filed: Feb. 24, 1995

[86] PCT No.: PCT/JP95/00279

§ 371 Date: Aug. 23, 1996

§ 102(e) Date: Aug. 23, 1996

[87] PCT Pub. No.: WO95/23185

PCT Pub. Date: Aug. 31, 1995

[30] Foreign Application Priority Data

Feb. 25, 1994 [JP] Japan .................................. 6-52776

[51] Int. Cl.$^6$ ........................................................ C08L 9/00
[52] U.S. Cl. .......................................................... 524/572
[58] Field of Search ............................................. 524/572

[56] References Cited

U.S. PATENT DOCUMENTS 3,801,520  4/1974  Hogan et al. .
4,753,991  6/1988  Bronstert .
4,791,174  12/1988  Bronstert et al. .
4,894,409  1/1990  Shimada et al. .
5,115,006  5/1992  Watanabe et al. ...................... 524/251

OTHER PUBLICATIONS

English Abstract of JP–A 1–101344, published Apr. 19, 1989.

*Primary Examiner*—Peter D. Mulcahy
*Attorney, Agent, or Firm*—Armstrong, Westerman, Hattori, McLeland & Naughton

[57] ABSTRACT

A rubber composition comprising (1) a rubber ingredient comprising a diene polymer rubber having a primary amino group, and (2) silica. The diene polymer rubber having a primary amino group is obtained by allowing a diene polymer having an active metal bound to the polymer molecule, to react with a N-unsubstituted aziridine compound. The rubber composition is made advantageously by a process wherein the above-mentioned rubber ingredient is mixed with silica, and then, additives other than the silica are incorporated in the rubber ingredient/silica mixture. The rubber composition exhibits good rebound resilience tensile properties and abrasion resistance.

14 Claims, No Drawings

RUBBER COMPOSITION AND PROCESS FOR PRODUCING THE SAME

TECHNICAL FIELD

This invention relates to a rubber composition comprising a diene polymer rubber having introduced therein a primary amino group, and silica, which has good rebound resilience, tensile properties and abrasion resistance, and further to a process for producing the rubber composition.

BACKGROUND ART

In recent years, requirements for a reduced fuel consumption in automobiles have become increasingly severe from a viewpoint of economy of resources or protection of the environment. Thus, rubber materials for tires having improved rolling resistance and abrasion resistance are eagerly desired. It is known that rolling resistance can be improved by incorporation of silica as a reinforcer in rubber, but the incorporation of a silica reinforcer enhances abrasion resistance and tensile properties to a smaller extent than that obtained by the incorporation of carbon black as a reinforcer in rubber.

A primary cause of this phenomenon is to be sought in the fact that, as compared with carbon black, silica has a poor affinity for rubber materials and exhibits a poor reinforcing effect thereon. A proposal of using a silane coupling agent has been made for enhancing the affinity of silica for rubber materials, for example, in Japanese Unexamined Patent Publication (JP-A) No. H3-252431 and JP-A H3-252433. This proposal has a problem such that the silane coupling agent is expensive and must be used in a large amount.

For enhancing the affinity of silica for rubber materials without the use of a silane coupling agent, another proposal of introduce into rubber materials a substitution group having a good affinity for silica, For example, the incorporation of an alkylsilano group (JP-A H1-188501), an alkoxysilano group (JP-A H5-230286) or a substituted amino group by the reaction of 4,4'-bis (diethylamino) benzophenone (JP-A S64-22940) in a diene polymer rubber by an anion polymerization has been proposed, and the incorporation of a tertiary amino group in a diene polymer rubber by an emulsion polymerization has been proposed in JP-A H1-101344. However, even though these modified rubber materials are used, the modified rubber compositions still do not have a good rolling resistance, and, as compared with carbon black-incorporated rubber compositions, the modified rubber compositions do not have good and balanced tensile stress and abrasion resistance.

It also has been proposed provide a primary amino group in a diene copolymer rubber. For example, the reaction of an anion polymer having an active lithium metal with an N-unsubstituted aziridine is described in U.S. Pat. No. 3,801,520; the reaction of an anion polymer with a cyclic hydrazine compound, followed by a ring-opening with hot concentrated hydrochloric acid, is described in JP-A S62-34904; and the reaction of an anion polymer with a bifunctional Schiff base compound, followed by hydrolysis under an acidic condition, is described in JP-A S 62-265305. However, these proposed techniques are concerned with the provision of modified polymer rubbers for modifying molding resin materials, and are completely silent on the use and characteristics thereof other than those as the modifiers for molding resin materials.

DISCLOSURE OF INVENTION

The object of the present invention is to provide a diene polymer rubber composition having a good rebound resilience leading to a good rolling resistance, and having tensile stress and abrasion resistance, comparing favorably with those of carbon black-incorporated rubber compositions; and further to provide an industrially advantageous process for producing the diene rubber composition.

In accordance with the present invention, there is provided a rubber composition comprising (1) a rubber ingredient comprising a diene polymer rubber having a primary amino group, and (2) silica.

Further, in accordance with the present invention, there is provided a process for producing a rubber composition characterized in that a rubber ingredient comprising a diene polymer rubber having a primary amino group is mixed with silica, and then, additives other than the silica are incorporated in the rubber ingredient/silica mixture.

BEST MODE FOR CARRYING OUT THE INVENTION

In the present invention, a diene polymer rubber having a primary amino group is used as a rubber ingredient. The process by which the diene polymer rubber is produced is not particularly limited, and the diene polymer rubber can be produced, for example, by allowing a diene polymer having an active metal bound to the polymer molecule, to react with an N-unsubstituted aziridine compound.

The bound active metal used is not particularly limited, provided that it is capable of reacting with, for example, an N-unsubstituted aziridine compound. Usually the active metal includes alkali metals and alkaline earth metals. The diene polymer having the active metal bound to the polymer molecule can be made, for example, by polymerizing a conjugated diene monomer or a mixture of a conjugated diene monomer with an aromatic vinyl monomer by an anion polymerization procedure using an initiator comprising an organic alkali metal and/or an organic alkaline earth metal in a hydrocarbon medium.

As specific examples of the conjugated diene monomer used, there can be mentioned 1,3-butadiene, 2-methyl-1,3-butadiene, 2,3-dimethyl-1,3-butadiene, 2-chloro-1,3-butadiene and 1,3-pentadiene. Of these, 1,3-butadiene and 2-methyl-1,3-butadiene are preferable because of enhanced copolymerizability. 1,3-Butadiene is most preferable.

As specific examples of the aromatic vinyl monomer used, there can be mentioned styrene, α-methylstyrene, 2-methylstyrene, 3-methylstyrene, 4-methylstyrene, 2,4-diisopropylstyrene, 2,4-dimethylstyrene, 4-t-butylstyrene and 5-t-butyl-2-methylstyrene. Of these, styrene is most preferable.

The ratio of the monomers used can be varied depending upon the particular properties intended, and the amounts of the conjugated diene monomer and the aromatic vinyl monomer are usually in the ranges of 40 to 100% by weight and 0 to 60% by weight, respectively, based on the total weight of the monomers. Preferably the amounts of the conjugated diene monomer and the aromatic vinyl monomer are in the ranges of 50 to 100% by weight and 0 to 50% by weight, respectively. If the amount of the aromatic vinyl monomer is too large, the copolymer becomes stiff, and the balance between wet-skid resistance and rebound resilience is deteriorated.

If desired, copolymerizable monoolefin monomers can be copolymerized with the above-mentioned conjugated diene monomer and aromatic vinyl monomer. As specific examples of the monoolefin monomers, there can be mentioned acrylic acid esters and methacrylic acid esters, such as methyl acrylate, methyl methacrylate, ethyl acrylate, 2-ethylhexyl acrylate, 2-ethylhexyl methacrylate, hydroxyethyl acrylate and hydroxyethyl methacrylate. The amount of the monoolefin monomers can be varied within the range in which the rubber composition having the desired properties is obtained, and it is usually in the range of 0 to 40% by weight based on the weight of the total monomers.

The procedure by which the above-mentioned monomers are subjected to an anion polymerization and the procedure by which the anion polymer having an active metal is modified with an N-unsubstituted aziridine compound are not particularly limited, and can be carried out under conventional conditions. For example, a procedure described in JP-A S58-162604 can be employed wherein an anion polymerization is effected in the presence of an initiator comprising an organic alkali metal or an organic alkaline earth metal in a hydrocarbon medium, and then, the anion polymer having an active metal is modified with an N-unsubstituted aziridine compound. The hydrocarbon medium is not particularly limited, and those which are usually used for an anionic polymerization can be used. As specific examples of the hydrocarbon medium, there can be mentioned n-hexane, cyclohexane, benzene and toluene. As specific examples of the organic alkali metal and organic alkaline earth metal initiators, there can be mentioned alkyl lithiums such as n-butyl lithium, sec-butyl lithium and t-butyl lithium, alkylene dilithiums such as 1,4-di-lithium butane, phenyl lithium, stilbene lithium, lithium naphthalene, sodium naphthalene, potassium naphthalene, n-butyl magnesium, n-hexyl magnesium, ethoxy calcium, calcium stearate, t-butoxy strontium, ethoxy barium, isopropoxy barium, ethylmercapto barium, t-butoxy barium, phenoxy barium, diethylamino barium, barium stearate and ketyl barium. These organic alkali metal and organic alkaline earth metal initiators may be used either alone or in combination. If desired, a small amount of a microstructure-modifying agent can be used in combination with the organic alkali metal and organic alkaline earth metal initiator. The microstructure-modifying agent includes, for example, ethers such as tetrahydrofuran and ethylene glycol, and tertiary amine compounds such as tetramethylethylene amine.

As a typical example of the modifier used for the preparation of the diene polymer rubber having a primary amino group, there can be mentioned an N-unsubstituted aziridine compound. The N-unsubstituted aziridine compound includes, for example, ethyleneimine and propyleneimine. The amount of the modifier is usually at least equimolar to the total active terminal groups of the anion polymer.

The content of a 1,2-vinyl group in the conjugated diene portion of the diene polymer rubber having a primary amino group is not particularly limited, but is usually in the range of 10 to 90% by weight, preferably 20 to 80% by weight and more preferably 30 to 70% by weight, based on the weight of the bound diene content. If the content of a 1,2-vinyl group is too small, the rubber composition has poor grip characteristics. In contrast, if the content of a 1,2-vinyl group is too large, the rubber composition has a poor abrasion resistance.

The viscosity of the diene polymer rubber used is not particularly limited, but the diene polymer rubber preferably has a Mooney viscosity ($ML_{1+4}$, 100° C.) of 20 to 150, more preferably 30 to 100, in view of the mechanical strength and processability. When the rubber is used as an oil-extended rubber, the Mooney viscosity may be higher than 150.

In the present invention, the diene polymer rubber having a primary amino group may be used either alone or in combination with other rubbers. When other rubbers are used, the proportion of the primary amino group-containing diene polymer rubber to the other rubbers is not particularly limited, but is usually used in an amount of at least 10% by weight, preferably at least 20% by weight. If the proportion of the primary, amino group-containing diene polymer rubber is too small, the tensile stress and abrasion resistance are not enhanced to the desired extent.

The rubbers used in combination with the primary amino group-containing diene polymer rubber are not particularly limited. As preferable examples of the rubbers used for tires, there can be mentioned natural rubber (NR), a polybutadiene rubber (BR), a polyisoprene rubber (IR), a styrene-butadiene copolymer rubber (SBR) and a styreneisoprene copolymer rubber (SIR). Of these, NR, BR, IR and SBR are especially preferable. As specific examples of the rubbers used for tires and in other applications, there can be mentioned an acrylonitrile-butadiene copolymer rubber, a butyl rubber, a halogenated butyl rubber and an epichlorohydrin rubber.

Among the above-mentioned rubbers, BR, SBR and SIR, which are obtained by an anion polymerization, may be subjected to a coupling treatment with a coupling agent having a bi- or higher functionality such as tin tetrachloride and silicon tetrachloride, or may be terminally modified with an organic silane compound such as an alkoxy-silane, a compound having a —C(=X)—N<bond wherein X is an oxygen or sulfur atom, such as N-methyl-2-pyrrolidone, N,N-diethylacetamide, N-ethyl-maleimide or N,N-diethylurea, or a benzophenone or thiobenzophenone compound having an amino group and/or a substituted amino group such as 4,4'-bis(diethylamine) benzophenone (when appropriate, abbreviated to "EAB").

The silica used in the present invention is not particularly limited, and those which are used for general-purpose rubbers can be used. Silica with silanol groups on the surface and having an average particle diameter of 10 to 50 µm is preferably used, and semi-particle forms are more preferable. As specific examples of the silica, there can be mentioned those which are usually used as a reinforcer and include dry white carbon, wet white carbon, colloidal silica and precipitated silica described in JP-A S62-62838. Of these, wet white carbon predominantly comprised of hydrous silicic acid is preferable. The dispersibility of the diene polymer rubber having an amino group used in the present invention can be prominently improved when silica in the acidic region or silica treated with an inorganic acid is used.

The amount of silica is not particularly limited, and is usually in the range of 20 to 150 parts by weight, preferably 40 to 120 parts by weight, based on 100 parts by weight of the above-mentioned rubber ingredient. If the amount of silica is too small, the reinforcing effect is poor. If the amount of silica is too large, the unvulcanized rubber composition has an undesirably high viscosity and a poor processability.

The rubber composition of the present invention can be prepared by mixing and kneading the respective ingredients in a conventional manner. Namely a mixture of the rubber ingredient and silica is mixed and kneaded together by a mixer such as a roll mixer or a Banbury mixer, followed by addition of optional additives. Silica may be incorporated with the rubber ingredient at once, but it is preferable that a predetermined amount of silica is incorporated in portions because silica becomes more dispersible in the rubber ingredient, the rubber ingredient and silica can easily be mixed together. For example, 10 to 90% by weight of the entire amount of silica is first incorporated, and the remainder is added at once or in portions.

As examples of the additives optionally incorporated, there can be mentioned those which are conventionally used in a rubber industry and which include sulfur, stearic acid, zinc oxide, a peroxide, a vulcanization accelerator such as a thiazole, thiuram or sulfenamide accelerator, an activator such as diethylene glycol or a silane coupling agent, carbon black such as HAF, ISAF or N339, a reinforcer such as calcium carbonate, a plasticizer, a filler, an aging stabilizer and a processing oil. Suitable additives are appropriately chosen depending upon the particular object or use. Of these, a silane coupling agent and an activator may be incorporated in the first stage together with silica in the rubber ingredient, but the other additives are preferably incorporated in the succeeding steps. This is because, if the additives, other than a silane coupling agent and an activator, are incorporated first together with silica in the rubber ingredient, the mixing time is prolonged and the reinforcing effect of silica is apt to be reduced.

When carbon black is incorporated in combination with silica, the diene polymer rubber having an amino group is used preferably in combination with an anion polymer rubber as the other rubber which has been modified with a coupling agent and/or terminal-modified. The proportion of silica to carbon black is not particularly limited, but is usually in the range of 9/1 to 1/9 by weight, preferably 8/2 to 2/8 by weight. The proportion of the diene polymer rubber to the anion polymer having been modified with a coupling agent or a terminal-modified is appropriately determined depending upon the intended object or use, and is usually in the range of 9/1 to 1/9 by weight, preferably 8/2 to 2/8 by weight.

The mixing of silica with the diene polymer rubber having an amino group is usually carried out at a temperature of 80° to 200° C., preferably 100° to 190° C. and more preferably 140° to 180° C. When the mixing temperature is too low, the abrasion resistance are enhanced only to a minor extent. In contrast, if the mixing temperature is too high, the polymer rubber is undesirably subject to burning. The mixing time is usually at least 30 seconds, preferably in the range of 1 to 30 minutes.

The invention will be described in detail by the following examples wherein parts and % are by weight unless otherwise specified. The physical properties and micro-structure of the polymer were determined by the following methods.
(1) Tensile strength and other tensile properties Tensile strength and other tensile properties were measured according to JIS K-6301.
(2) Rebound resilience Rebound resistance was evaluated for rolling resistance, and was measured by using a Lupke rebound resilience tester at a temperature of 60° C.
(3) Abrasion resistance Abrasion resistance was measured by using a Pico abrasion tester according to ASTM D-2228 at room temperature.
(4) Average molecular weight of polymer The average molecular weight was expressed in terms of that of standard polystyrene as measured by GPC,
(5) Styrene content in polymer and 1,2-vinyl content in butadiene portion The styrene content in polymer and the 1,2-vinyl content in butadiene portion were determined by infrared spectroscopy (Humpton method).

PRODUCTION EXAMPLE 1

An autoclave equipped with a stirrer was charged with 8,000 g of cyclohexane, 460 g of styrene and 700 g of butadiene, followed by addition of 3 millimoles of tetramethylethylene diamine and 20 millimoles of n-butyl lithium to initiate a polymerization at 70° C. Midway during the polymerization, 840 g of butadiene was continuously added. After it was confirmed that the conversion reached 100%, the modifier shown in Table 1 was added in an amount equimolar to the active terminals of polymer (i.e., an amount of the catalyst used from which the amount of catalyst deactivated by the monomers and the solvent was subtracted), whereby the reaction was effected for 20 minutes. As a terminator, 20 millimoles of methanol was added and then 20 g of 2,6-di-t-butyl phenol was added. A polymer (SBR) was recovered by a steam-stripping method. The amount of styrene, the amount of 1,2-vinyl group and the molecular weight were determined. The results are shown in Table 1.

PRODUCTION EXAMPLE 5 and 6

An autoclave equipped with a stirrer was charged with 8,000 g of cyclohexane, 900 g of styrene and 1,100 g of butadiene, followed by addition of 25 millimoles of tetramethylethylene diamine and 5 millimoles of n-butyl lithium to initiate a polymerization at 50° C. After it was confirmed that the conversion reached 100%, the modifier shown in Table 1 was added in the same manner as in Production Example 1 to prepare BR modified with propyleneimine. For comparison, an unmodified BR was prepared. The 1,2-vinyl content and the molecular weight are shown in Table 1.

TABLE 1

| Production Example No. | 1 | 2 | 3 | 4 | 5 | 6 | 7 | 8 |
|---|---|---|---|---|---|---|---|---|
| Diene polymer rubber | A | B | C | D | E | F | G | H |
| Styrene content (%) | 21.9 | 22.1 | 23.4 | 23.3 | 45.1 | 45.0 | — | — |
| Vinyl content in butadiene (%) | 22.2 | 20.5 | 20.1 | 19.1 | 47.2 | 47.0 | 17.1 | 19.1 |
| Mw (×10,000) *1 | 23.5 | 23.6 | 60.5 | 24.1 | 75.2 | 75.2 | 20.7 | 20.7 |
| Modifier *2 | P1 | EAB | $SnCl_4$ | — | P1 | — | P1 | — |

*1 Weight average molecular weight (×10,000)
*2 Modifiers
P1: Propyleneimine
$SnCl_4$: Tin tetrachloride
EAB: N,N,N',N'-bis(tetraethylamino)benzophenone

EXAMPLES 1 AND 2 AND COMPARATIVE EXAMPLES 1 to 5

Rubber compositions were prepared according to the recipe shown in Table 2 wherein 100 parts of diene polymer rubber A, B, C or D was mixed and kneaded together with additives, other than sulfur and a vulcanization accelerator, by a Banbury mixer at 140° C. The operation of mixing and kneading rubber composition 1 was conducted twice, i.e., first for 2 minutes and secondly for 2.5 minutes, and the operation of mixing and kneading rubber compositions 2 and 3 was conducted each once for 4.5 minutes. Sulfur and a vulcanization accelerator were then added to each of the kneaded mixtures and further kneaded by open rolls at 50° C., and the kneaded mixture was press-cured at 160° C. for 30 minutes to prepare a testing specimen. The physical properties of the vulcanized product were evaluated. The results are shown in Table 3.

TABLE 2

| Rubber composition | 1 | | 2 | 3 |
|---|---|---|---|---|
| Mixing operation | First | Second | Once | Once |
| Polymer Rubber | 100 | — | 100 | 100 |
| Silica *1 | 25 | 25 | 50 | — |
| N-339 carbon *2 | — | — | — | 50 |
| Plasticizer (Aroma-oil) | — | 5 | 5 | 5 |
| Zinc oxide #1 | — | 3 | 3 | 3 |
| Stearic acid | — | 2 | 2 | 2 |
| Aging stabilizer *3 | — | 1 | 1 | 1 |
| Sulfur #325 | — | 2 | 2 | 2 |
| Vulcanization accelerator *4 | — | 2 | 2 | 1.5 |

*1 Nipsil AQ supplied by Nippon Silica K.K.
*2 Seast KH supplied by Toukai Carbon K.K.
*3 Nocrac 6C supplied by Ohuchi Shinko K.K.
*4 Nocceler supplied by Ohuchi Shinko K.K.

EXAMPLES 3 TO 5

Vulcanized rubbers were prepared by the same procedures as described in Example 1 wherein diene polymer rubber mixtures of A 50 parts/B 50 parts, A 50 parts/C 50 parts and A 50 parts/D 50 parts were used as the rubber material with all other conditions remaining the same. The properties of the vulcanized rubbers were evaluated, The results are shown in Table 3.

TABLE 3

| | Examples of Invention | | | | | Comparative Examples | | | | |
|---|---|---|---|---|---|---|---|---|---|---|
| Example No. | 1 | 2 | 3 | 4 | 5 | 1 | 2 | 3 | 4 | 5 |
| Diene polymer rubber | A | A | A/B | A/C | A/D | B | C | D | B | D |
| composition No. | 1 | 2 | 1 | 1 | 1 | 1 | 1 | 1 | 2 | 3 |
| Physical properties | | | | | | | | | | |
| Tensile strength (kg/cm$^2$) | 202 | 176 | 192 | 230 | 190 | 185 | 205 | 175 | 204 | 135 |
| 300% Modulus (kg/cm$^2$) | 142 | 112 | 135 | 141 | 129 | 85 | 70 | 62 | 72 | 135 |
| Elongation (%) | 420 | 510 | 410 | 420 | 430 | 580 | 590 | 680 | 630 | 530 |
| Rebound resilience 60° C. (°C.) | 65 | 59 | 62 | 67 | 61 | 59 | 61 | 57 | 57 | 56 |
| Pico abrasion index | 112 | 88 | 101 | 108 | 98 | 87 | 72 | 61 | 68 | 100 |

As seen from Table 3, the rubber compositions of the present invention exhibit high rebound resilience and high abrasion resistance, as compared with those of Comparative Examples. Especially when the rubber compositions are prepared according to composition No. 1, i.e., by a procedure wherein the rubber ingredient and silica are first mixed and kneaded together, followed by addition of the other additives, the beneficial results are more prominently manifested. When a silane-coupling agent is used (Example 4), the beneficial results also are more prominently manifested. The rubber compositions of the present invention exhibit rebound resilience much higher and abrasion resistance approximately equal to or higher, than those of Comparative Example 5 wherein carbon black is used instead of silica.

EXAMPLES 6 AND 7 AND COMPARATIVE EXAMPLES 6 AND 7

Vulcanized rubbers were prepared by the same procedures as described in Example 1 wherein 10 parts of diene polymer rubbers E, F, G or H shown in Table 4 was used as the rubber material with all other conditions remaining the same. The properties of the vulcanized rubbers were evaluated. The results are shown in Table 4.

TABLE 4

| | Examples of Invention | | Comparative Examples | |
|---|---|---|---|---|
| Example No. | 6 | 7 | 6 | 7 |
| Diene polymer rubber | E | G | F | H |
| composition No. | 1 | 1 | 1 | 1 |
| Physical properties | | | | |
| Tensile strength (kg/cm$^2$) | 240 | 200 | 250 | 170 |
| 300% Modulus (kg/cm$^2$) | 145 | 120 | 60 | 50 |
| Elongation (%) | 390 | 440 | 720 | 680 |
| Rebound resilience 60° C. (°C.) | 60 | 75 | 55 | 70 |
| Pico abrasion index | 110 | 140 | 62 | 100 |

As seen from Table 4, even when the diene polymer rubber used is BR or SBR containing a large amount of styrene and a large amount of 1,2-vinyl group, if the rubber has introduced therein a primary amino group, all of the 300% modulus, impact resilience and abrasion resistance are greatly improved.

INDUSTRIAL APPLICABILITY

The diene polymer rubber composition of the present invention exhibits an enhanced rolling resistance without substantial reduction of tensile properties and abrasion resistance. This is in sharp contrast with a conventional diene polymer rubber composition containing silica. The rolling resistance, tensile properties and abrasion resistance of the rubber composition of the present invention are well balanced. This is in sharp contrast with a conventional diene rubber composition containing carbon black. The rubber composition of the present invention can be used for tires, shoe soles, vibration insulators, belts, flooring materials and others.

We claim:

1. A rubber composition comprising:
   (1) a rubber ingredient comprising, based on the weight of the rubber ingredient, 10 to 100% by weight of a diene polymer rubber having a primary amino group, and 0 to 90% by weight of other rubber, and (2) 20 to 150 parts by weight of silica based on 100 parts by weight of the rubber ingredient;

said diene polymer rubber having a primary amino group being obtained by allowing a diene polymer having an active metal bound to the polymer molecule, to react with an N-unsubstituted aziridine compound; said diene polymer having the active metal comprising 40 to 100% by weight of conjugated diene monomer units containing 10 to 90% by weight of 1,2-vinyl groups, and 0 to 60% by weight of aromatic vinyl monomer units.

2. A process for producing a rubber composition, which comprises the steps of:

mixing (1) a rubber ingredient comprising, based on the weight of the rubber ingredient, 10 to 100% by weight of a diene polymer rubber having a primary amino group, and 0 to 90% by weight of other rubber, with (2) 20 to 150 parts by weight of silica based on 100 parts by weight of the rubber ingredient; said diene polymer rubber having a primary amino group being obtained by allowing a diene polymer having an active metal bound to the polymer molecule, to react with an N-unsubstituted aziridine compound; said diene polymer having the active metal comprising 40 to 100% by weight of conjugated diene monomer units containing 10 to 90% by weight of 1,2-vinyl groups, and 0 to 60% by weight of aromatic vinyl monomer units; and then, incorporating additives other than the silica in the thus-obtained rubber ingredient/silica mixture.

3. A rubber composition as claimed in claim 1 wherein said bound active metal is an active metal terminal formed by an anion polymerization.

4. A rubber composition as claimed in claim 1 wherein said active metal is at least one metal selected from alkali metals and alkaline earth metals.

5. A rubber composition as claimed in claim 1 wherein the conjugated diene monomer is 1,3-butadiene.

6. A rubber composition as claimed in claim 1 wherein the aromatic vinyl monomer is styrene.

7. A rubber composition as claimed in claim 1 wherein the N-unsubstituted aziridine compound is ethyleneimine or propyleneimine.

8. A rubber composition as claimed in claim 1 wherein the silica has silanol groups on the surface thereof and an average particle diameter of 10 to 50 $\mu$m.

9. A rubber composition as claimed in claim 1 wherein said other rubber is at least one rubber selected from natural rubber, polybutadiene rubber, polyisoprene rubber and styrene-butadiene copolymer rubber.

10. A rubber composition as claimed in claim 1 wherein said other rubber is obtained by allowing the polymer having an active terminal group obtained by an anion polymerization of a conjugated diene monomer alone or a combination of a conjugated diene monomer with an aromatic vinyl monomer, to react with at least one compound selected from coupling compounds, organic silane compounds, compounds having an atomic group represented by the general formula: —C(=X)—N<wherein X represents an oxygen or sulfur atom, in the molecule, and benzophenone compounds having an amino group and/or a substituted amino group.

11. A rubber composition as claimed in claim 10 wherein said coupling compound is tin tetrachloride or silicon tetrachloride.

12. A process for producing a rubber composition as claimed in claim 2 wherein the silica is added in portions and kneaded together with the rubber ingredient.

13. A process for producing a rubber composition as claimed in claim 2 wherein 10 to 90% by weight of the entire silica is first added and the remainder portions thereof are added in the second and succeeding steps.

14. A process for producing a rubber composition as claimed in claim 2 wherein the rubber ingredient and silica are mixed together at a temperature of 80° to 200° C.

* * * * *